G. E. ROHMER.

LEAD PACKED ANCHOR BOLT.

APPLICATION FILED MAR. 13, 1911.

Reissued Dec. 10, 1912. 13,496.

Witnesses
C. M. Dorman
John Murtagh

Inventor
Gabriel E. Rohmer
by Frederick Goepel
his Attorneys.

UNITED STATES PATENT OFFICE.

GABRIEL E. ROHMER, OF WOODSIDE, NEW YORK, ASSIGNOR OF THREE-FOURTHS TO J. FRANCIS BOORAEM, OF NEW YORK, N. Y.

LEAD-PACKED ANCHOR-BOLT.

Specification of Reissued Letters Patent. Reissued Dec. 10, 1912.

13,496.

Original No. 977,402, dated November 29, 1910, Serial No. 557,725. Application for reissue filed March 13, 1911. Serial No. 614,273.

*To all whom it may concern:*

Be it known that I, GABRIEL E. ROHMER, a citizen of the United States, residing at Woodside, in the county of Queens and State of New York, have invented a new and useful Lead-Packed Anchor-Bolt, of which the following is a specification.

My invention relates to improvements in lead packed anchor bolts, by which the bolt is anchored into a foundation or stone hole in a more rational and theoretical way than it is done now, thus doing away with the old style bolt lead packing, which consists in filling up and packing with sheet lead the open space left all around a bolt placed in a hole into which it has to be anchored.

I attain this object by the device illustrated in the accompanying drawings in which—

Figure 1:
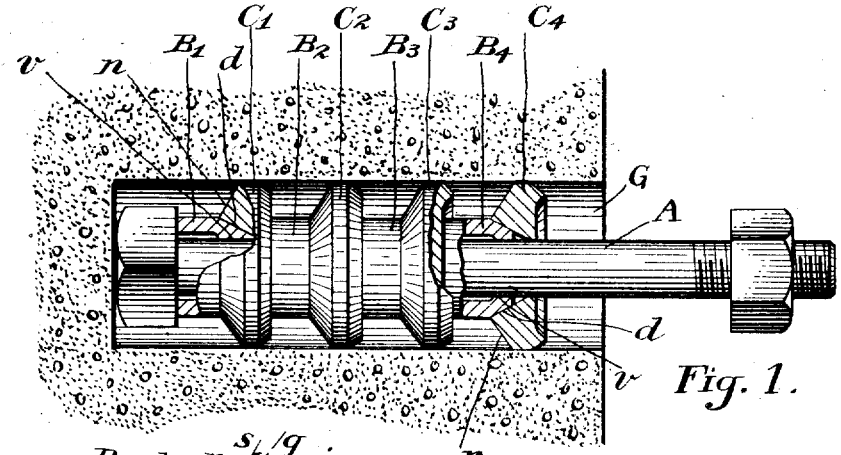
Figure 2:
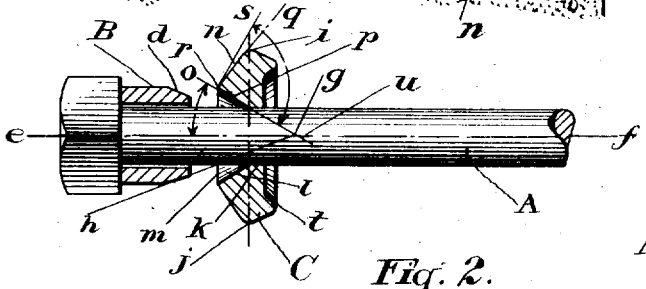
Figure 3:
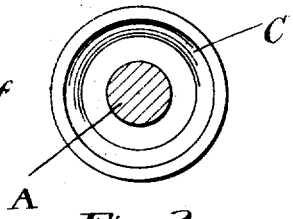
Figure 4:
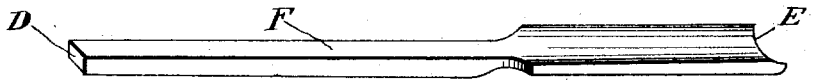

Figure 1, is an illustration showing how a bolt is anchored in a hole by the use of the present invention, Fig. 2, is a longitudinal section of the bolt and anchor device, and Fig. 3, an end elevation, Fig. 4, illustrates a tool used for packing purposes.

Similar letters refer to similar parts throughout the several views.

The anchor bolt device of the present invention is composed of three parts as illustrated in Fig. 2—the bolt itself A, the collar B and the anchor washer C. The bolt A, (Figs. 1, 2 and 3) is an ordinary bolt of any size as commonly supplied by the trade, but generally with a square head as bolts with such heads are almost exclusively used in foundation work. The collar B (Fig. 2) is made of lead or any other soft metal, of an appropriate thickness and with the inside hole of a diameter slightly larger than the diameter of the bolt A. An end of this collar is beveled as shown by letter *d*, Figs. 1 and 2, this bevel making with the center of hole *e f*, Fig. 2, (this center being also the center of the bolt A) an angle *e*, *g*, *h*, about 30°, (same figure). The other end of the collar is plain like a bushing and its length is about equal to the diameter of the bolt used. But this length can be changed according to the depth of the hole into which the bolt has to be anchored.

The anchor washer C (Figs. 2 and 3) is the most important part of this device and is also made of lead. Its shape being that of two truncated cones whose bases would be coincident on line *i j* (see Fig. 2). The diameter of the hole in this anchor washer C, Fig. 2, is of a few thousandths of an inch larger than the diameter of the bolt A; the bolt fitting therein by a push fit. As illustrated by letter *k*, Fig. 2, the anchor washer hole runs straight, a short distance and corresponds to the size of the bolt A. Then it spreads open to be a counter-sunk hole *l*, of an outside diameter *m*, equal to the outside diameter of the collar B (Fig. 2). The periphery *p* of the countersunk hole *l* makes with the center *e*, *f* of the anchor washer an angle *o*, *u*, *e*, equal to 30° (Fig. 2.) The outside diameter of the anchor washer C (Fig. 2) taken at line *i j* is larger than the diameter of the hole into which the anchor bolt has to be set. The conditions governing the size of that outside diameter will be set forth hereafter.

As illustrated in Figs. 1 and 2, it will be seen that the truncated cone edge *n*, of the anchor washer C, Fig. 2, makes with the bevel hole *l*, peripherical side *p*, an angle *q*, *r*, *u* slightly less than 90°; the angle *s*, *r*, *u* being a right angle. It will also be noticed that the other side of this anchor washer C, Fig. 2, is cast with a ridge *t*.

The object and use of the different angles *q*, *r*, *u* and *s*, *r*, *u*, as well as of the circumferential ridge *t*, Fig. 2, will be set forth in the following explanation of how to set this anchor bolt into a foundation hole and why it holds on.

To anchor a bolt of this system into a concrete hole G (for instance) it is first necessary to have an iron bar of a square or round section, small enough to work freely between the bolt A (Fig. 1) and the inside periphery of the hole. But a tool D, with a concave blade E, as illustrated in Fig. 4, and having a handle F (same figure) of a length to suit the depth of the concrete hole would certainly give the best results.

The bolt A, Fig. 1, onto which the collar B′ has been slipped is dropped into the concrete hole G, the head resting upon the bottom of the hole. The plain end of the collar B′, (Fig. 1) rests on the bolt head while its beveled end *d* stands ready to receive the anchor washer C′ (Figs. 1 and 2.) The anchor washer has an outside diameter larger than the diameter of the concrete hole G, Fig. 1. The size of this diameter will be determined by experiments, but must be such as to necessitate the use of a hammer and of the tool D, to drive the anchor washer C′ into the hole G, (Fig. 1). Preparatory to driving the anchor washer into the hole, it must be placed in such a way as to have its countersunk hole *l*, (Fig. 2) when driven down the concrete hole to fit exactly over the beveled end *d* of the collar B′ (Fig. 1).

As mentioned before, the bevel edge of collar B′, makes with the center of the bolt an angle *e*, *g*, *h* about equal to the 30° angle *o*, *u*, *e*, of the anchor washer C, (see Fig. 2.) This angle causes the beveled edge *d*, of collar B′ to act as a wedge, collapse (on account of the softness of the metal of which it is made) and draw tightly all around the bolt A, (see *v*, Fig. 1.) A perfect seat for the anchor washer C′ is thus obtained, that seat making an angle of 30° with the center of the bolt A, see Fig. 1. By driving the anchor washer C′ into the concrete hole G, (Fig. 1) the opening of the angle *q*, *r*, *u*, Fig. 2, is a good deal lessened owing to the malleability of the lead; which causes the anchor washer C′ to draw closer to the center of the bolt A, (Fig. 1). Now, if, with the tool D, Fig. 4, the circumferential ridge *t*, Fig. 2, is hammered down against the periphery of hole G, Fig. 1, the angle *q*, *r*, *u*, (Fig. 2) is increased again close to 90°. It will be readily understood that by a careful hammering of the ridge *t*, Fig. 2, a perfect packing of the anchor washer C′, Fig. 1, will be obtained as the metal will draw back all around the bolt on the bevel seat made by the collar B′. As that collar bevel seat makes, with the center of the bolt, an angle of 30° and as the anchor washer in drawing back makes with the collar bevel seat an angle close to 90° all around the bolt, this device offers a perfect and theoretical truss line to resist any force exerted on the bolt to pull it out of the hole.

The collar B′ and anchor washer C′ being an anchorage unit it is possible to multiply those units as was done in Fig. 1, by successively packing collar $B^2$ on top of anchorage washer C′ and so on. The anchor bolt illustrated in Fig. 1, being anchored by 4 units B′ and C′ being the first, $B^2$ and $C^2$ the second, $B^3$ and $C^3$ the third and $B^4$ and $C^4$ the fourth unit (see Fig. 1.)

The application of this mode of anchoring bolts into foundations has a wide scope and will be readily employed where expansion bolts and the old style lead packing were used before. I also do not limit myself to the kind of metal of which the collar and anchor washer can be made, but it appears to me that a soft metal should give the best results.

The above description and drawing shows one embodiment of my invention, but within the scope of the appended claims other embodiments may be made without departing from the spirit and underlying principles of my invention.

I claim:

1. The combination of a collar and a washer, the latter having its outer part capable of movement in either direction, said washer when moved forming a truss with the collar, said truss being composed of one truss line substantially 30° to the axes of the collar and washer, and of another truss line at substantially 90° to the first.

2. The combination of a collar and a washer having a hole, the sides of which hole form an angle of substantially 30° with the axis of the washer, said collar and washer when coöperating forming a truss composed of a truss line formed by the hole side of the washer, and of another truss line substantially 90° to that line.

3. The combination of a collar and a washer, said washer being of larger diameter than the collar, and having part of its extended surface capable of movement in either direction parallel with the axes of the collar and washer, pivotally in respect to a point on the axis.

4. The combination of a collar having a beveled end, and a washer forming a seat with the beveled end, of substantially 30°, and having a peripherical side forming with the seat an angle of substantially 90°.

5. The combination of a collar and a washer, the washer having surfaces, one of which meets the collar and the other of which makes with the meeting surface an angle of 90°.

6. The combination of a collar having a beveled end of 30° and a washer having a beveled interior hole of 30°, said washer being of larger diameter than the collar and having part of its outer surface capable of movement in either direction, and also having part at right angles to the beveled end of the washer.

7. An anchor bolt, comprising a bolt, a soft metal collar beveled on one end and loosely surrounding said bolt, and an integral soft metal washer in the form of two truncated cones placed base to base contacting with the aforesaid collar, thereby constituting an anchorage unit substantially as described.

8. In combination, a bolt, a collar surrounding said bolt having one end plane and the other end beveled, a washer in the form of truncated cones secured at their bases contacting with said collar, said bolt by means of its head forming a stop for the collar, the other end of the bolt being threaded and provided with an adjusting nut, substantially as described.

In testimony whereof, I have signed my name to this specification in the presence of two subscribing witnesses.

GABRIEL E. ROHMER.

Witnesses:
H. GOEPEL,
FRANCIS BOORAEM.